US010999472B2

(12) United States Patent
Sakazaki (10) Patent No.: US 10,999,472 B2
(45) Date of Patent: May 4, 2021

(54) ORIGINAL DOCUMENT DETECTION APPARATUS AND ORIGINAL DOCUMENT DETECTION METHOD (71) Applicant: FUJIFILM Corporation, Tokyo (JP)

(72) Inventor: Yoshiki Sakazaki, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/790,948

(22) Filed: Feb. 14, 2020

(65) Prior Publication Data
US 2020/0186673 A1 Jun. 11, 2020

Related U.S. Application Data (63) Continuation of application No. PCT/CN2018/026322, filed on Jul. 12, 2018.

(30) Foreign Application Priority Data

Aug. 18, 2017 (JP) .............................. JP2017-158009

(51) Int. Cl.
H04N 1/407 (2006.01)
H04N 1/00 (2006.01)

(52) U.S. Cl.
CPC ....... *H04N 1/4078* (2013.01); *H04N 1/00251* (2013.01); *H04N 1/00816* (2013.01)

(58) Field of Classification Search
CPC ............. H04N 1/4078; H04N 1/00251; H04N 1/00816
See application file for complete search history.

(56) References Cited

U.S. PATENT DOCUMENTS

2007/0058864 A1 3/2007 Chien
2009/0185752 A1* 7/2009 Dwivedula ........ H04N 1/00774
382/256
(Continued)

FOREIGN PATENT DOCUMENTS

JP 63-153682 A 6/1988
JP 2005-346585 A 12/2005
(Continued)

OTHER PUBLICATIONS

Extended European Search Report dated Jul. 9, 2020 for Application No. 18846913.4.
(Continued)

*Primary Examiner* — Quang N Vo
(74) *Attorney, Agent, or Firm* — Birch, Stewart, Kolasch & Birch, LLP (57) ABSTRACT A background image is acquired by imaging an opening plate as a background of an original document in a state where the original document is not arranged. Next, an original document including background image is acquired by imaging the same range as the background image in a state where the original document is arranged on an upper surface of the opening plate. Next, a difference image is generated by subtracting the background image from the original document including background image. In addition, an inverse difference image is generated by subtracting the original document including background image from the background image. A region of the original document is detected based on the difference image and the inverse difference image.

16 Claims, 11 Drawing Sheets (56) References Cited

U.S. PATENT DOCUMENTS

2014/0118796 A1* 5/2014 Isaev ............... H04N 1/00018
358/451
2017/0155785 A1 6/2017 Mizude et al.

FOREIGN PATENT DOCUMENTS

| | | |
|---|---|---|
| JP | 2014-103636 A | 6/2014 |
| JP | 2014-220772 A | 11/2014 |
| JP | 2015-198406 A | 11/2015 |
| WO | WO 87/04531 A1 | 7/1987 |

OTHER PUBLICATIONS

International Preliminany, Report on Patentability and Written Opinion of the International Searching Authority(Forms PCT/IB/326, PCT/IB/373 and PCT/ISA/237), dated Feb. 27, 2020, for International Application No. PCT/JP2018/026322, with an English Translation.

International Search Report (Form PCT/ISA/210), dated Oct. 9, 2018, for International Application No. PCT/JP2018/026322, with an English translation.

* cited by examiner

ORIGINAL DOCUMENT DETECTION APPARATUS AND ORIGINAL DOCUMENT DETECTION METHOD

CROSS-REFERENCE TO RELATED APPLICATIONS

This application is a Continuation of PCT International Application No. PCT/JP2018/026322 filed on 12 Jul. 2018, which claims priority under 35 U.S.C § 119(a) to Japanese Patent Application No. 2017-158009 filed on 18 Aug. 2017. The above application is hereby expressly incorporated by reference, in its entirety, into the present application.

BACKGROUND OF THE INVENTION

1. Field of the Invention

The present invention relates to an original document detection apparatus and an original document detection method of detecting an original document arranged on a background.

2. Description of the Related Art

An original document such as a photograph arranged on a background may be imaged and obtained as electronic data (converted into image data). In such a case, it is difficult that an imaging range matches the original document. Thus, a work of imaging a range slightly larger than the original document and extracting (cutting) the region of the original document from the obtained image is performed. In the cutting of the region of the original document, it is necessary to detect the region of the original document. Meanwhile, for example, JP1988-153682A (JP-S63-153682A) and JP2005-346585A disclose a configuration in which a detection target is detected by obtaining a difference between an image obtained by capturing the detection target and a background and an image obtained by capturing only the background. The region of the original document can be detected using such a technology.

That is, a background image is acquired by imaging the background of the original document in a state where the original document is not arranged, and an original document including background image is acquired by arranging the original document on the background and imaging the same range as the background image. A difference image may be generated by subtracting the background image from the original document including background image, that is, subtracting the gradation values of corresponding pixels of the background image from the gradation values of the pixels of the original document including background image, respectively. The region of the original document may be detected based on the generated difference image.

SUMMARY OF THE INVENTION

However, accurate detection may not be performed using the method of the related art. That is, in the related art, the region of the original document is detected based on one difference image. The difference image is generated for the purpose of offsetting the background by subtracting the background image from the original document including background image, that is, differentiating the background from the region of the original document that is not offset by setting the gradation value of the background to 0. However, a part having a high gradation value and a part having a low gradation value coexist in one original document. In addition, the subtraction is also performed on the region of the original document (the background image is also subtracted from the region of the original document). Thus, a problem arises in that in the region of the original document, the gradation value is set to "0" in a part having a lower gradation value than the background image and is regarded as the background.

The present invention is conceived in view of the above background. An object of the present invention is to provide an original document detection apparatus and an original document detection method capable of more accurately detecting a region of an original document.

In order to resolve the object, an original document detection apparatus of the present invention comprises an imaging unit that acquires a background image by imaging a background of an original document in a state where the original document is not arranged, and acquires an original document including background image by imaging the same range as the background image in a state where the original document is arranged on the background, a difference image generation unit that generates a difference image obtained by subtracting gradation values of corresponding pixels of the background image from gradation values of pixels of the original document including background image, respectively, an inverse difference image generation unit that generates an inverse difference image obtained by subtracting the gradation values of the corresponding pixels of the original document including background image from the gradation values of the pixels of the background image, respectively, and an original document region detection unit that detects a region of the original document based on the difference image and the inverse difference image.

The original document detection apparatus may further comprise a sum image generation unit that generates a sum image obtained by summing gradation values of pixels of the difference image and gradation values of corresponding pixels of the inverse difference image, in which the original document region detection unit detects the region of the original document based on the sum image.

The original document region detection unit may detect a region having the gradation value of the pixel higher than a preset threshold value in the sum image as the region of the original document.

The original document region detection unit may calculate line segments of a rectangle that forms a boundary of a region having the gradation value higher than a preset threshold value in the sum image, and detect a region surrounded by the calculated line segments as the region of the original document.

The background image may be an image having a predetermined pattern.

An opening plate in which a plurality of openings are arranged may be the background.

An air drawing apparatus that draws air from the openings to a rear surface side of the opening plate may be disposed.

The opening plate may be white, and a black member may be arranged behind the opening plate.

In addition, in order to resolve the object, an original document detection method of the present invention comprises an imaging step of acquiring a background image by imaging a background of an original document in a state where the original document is not arranged, and acquiring an original document including background image by imaging the same range as the background image in a state where the original document is arranged on the background, a difference image generation step of generating a difference image obtained by subtracting gradation values of corresponding pixels of the background image from gradation values of pixels of the original document including background image, respectively, an inverse difference image generation step of generating an inverse difference image obtained by subtracting the gradation values of the corresponding pixels of the original document including background image from the gradation values of the pixels of the background image, respectively, and an original document region detection step of detecting a region of the original document based on the difference image and the inverse difference image.

According to the present invention, the region of the original document is detected based on the difference image generated by subtracting the background image from the original document including background image, and the inverse difference image generated by subtracting the original document including background image from the background image. Thus, the region of the original document can be more accurately detected than the region of the original document that is detected based on only one of the difference image and the inverse difference image.

DESCRIPTION OF THE PREFERRED EMBODIMENTS

Figure 1:
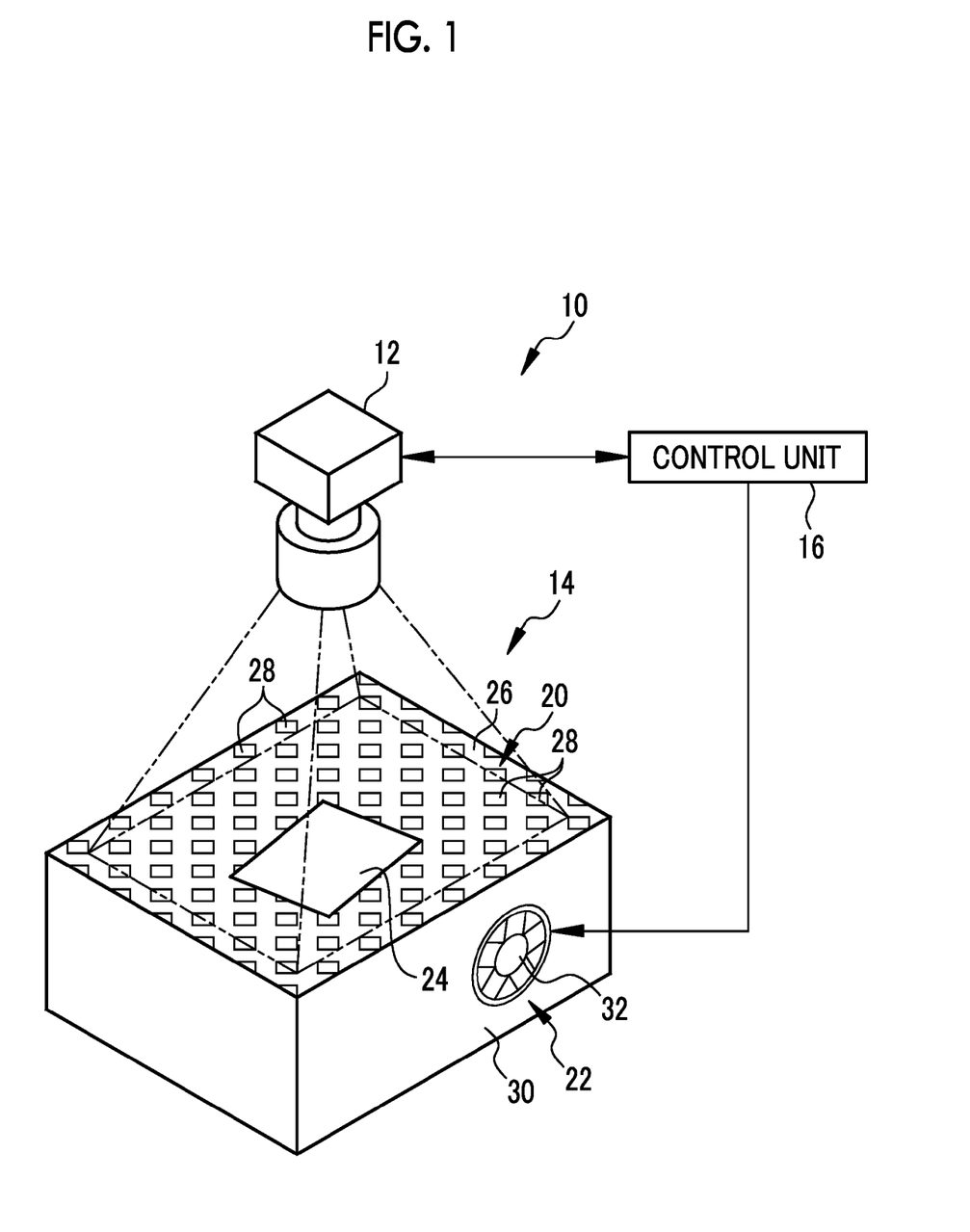
FIG. 1 is a descriptive diagram of an original document detection apparatus of an embodiment of the present invention.

As illustrated in FIG. 1, an original document detection apparatus 10 according to an embodiment of the present invention comprises a camera 12 (one example of an imaging unit), a stage 14, and a control unit 16. The camera 12 is a well-known digital camera that acquires an image in a format of image data having a gradation value (value indicating light and shade of color) for each pixel by performing imaging. The camera 12 is fixed above the stage 14 and acquires the image data by performing the imaging using a predetermined range of the upper surface of the stage 14 as an imaging range under control of the control unit 16.

The stage 14 comprises an opening plate 20 and an air drawing apparatus 22. The opening plate 20 comprises a main body 26 of a plate shape on which an original document 24 such as a photograph is arranged. Openings 28 that pass through the main body 26 are formed in the main body 26. The openings 28 are longitudinally and laterally arranged at predetermined pitches across the whole area of the main body 26.

The air drawing apparatus 22 comprises a chamber 30 and a fan 32. The chamber 30 is formed in a box shape of which the upper surface is open. The chamber 30 is connected to the lower surface of the opening plate 20 to cover a space below the opening plate 20. In the present embodiment, the opening plate 20 is white, and the inner surface of the chamber 30 is black (the chamber 30 functions as a black member according to the embodiment of the present invention). By doing so, when the opening plate 20 is imaged, the main body 26 is imaged in white, and the openings 28 are imaged in black (the inner surface of the chamber 30 is imaged in black through the openings 28). Thus, the contrast between the main body 26 and the openings 28 is increased.

In addition, in the chamber 30, an opening is formed in a part (in the present embodiment, a side surface) different from the upper surface. The fan 32 is installed in the opening. The fan 32 blows gas (air) inside the chamber 30 to the outside of the chamber 30. Accordingly, outside air (gas (air) outside the chamber 30) is drawn into the chamber 30 from the openings 28 of the opening plate 20. In a case where the original document 24 is arranged on the upper surface of the opening plate 20, the original document 24 adheres to the upper surface of the opening plate 20, and distortion, curling, positional deviation, and the like of the original document 24 are prevented.

Figure 2:
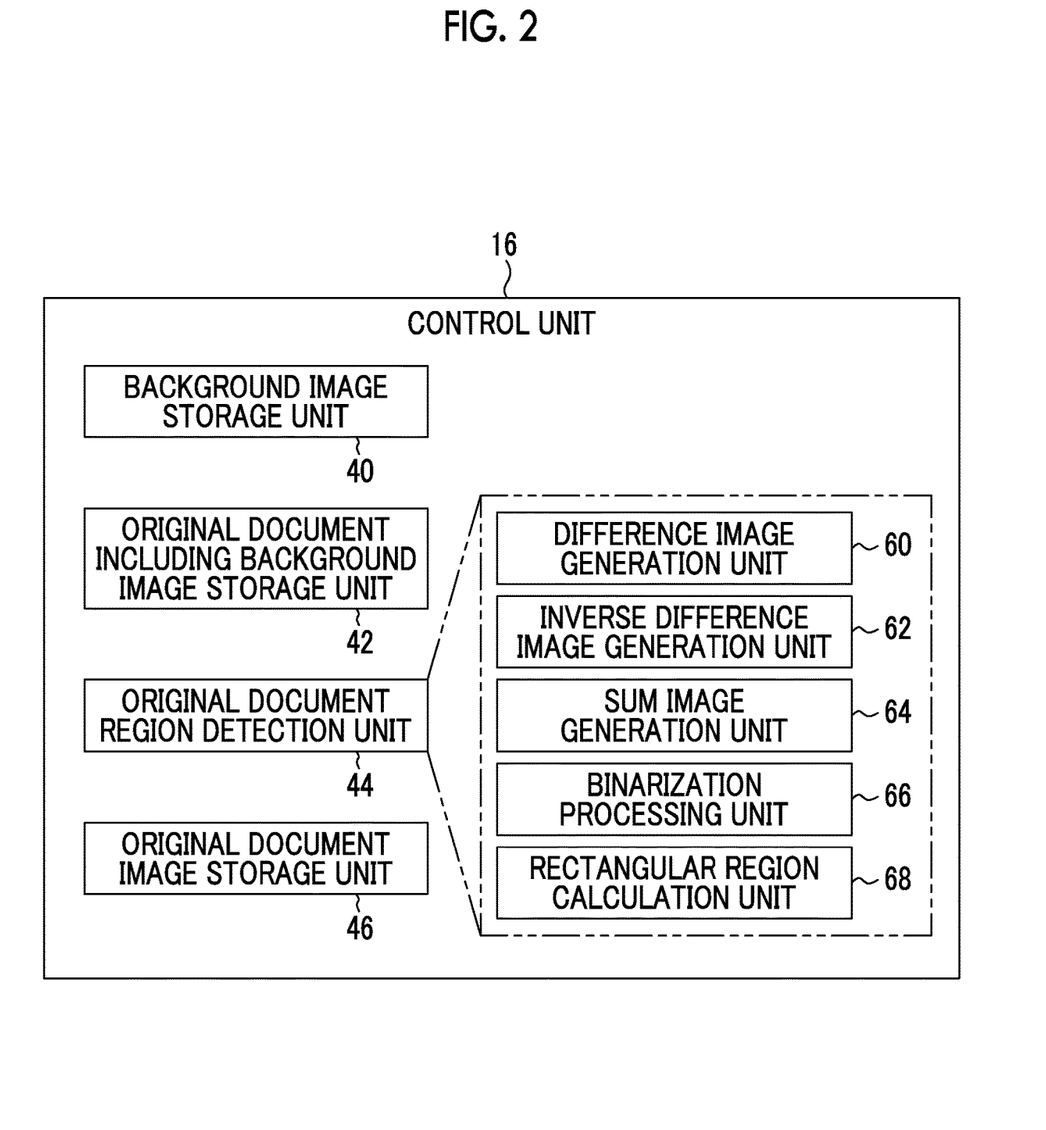
FIG. 2 is a block diagram illustrating a configuration of a control unit.

As illustrated in FIG. 2, the control unit 16 comprises a background image storage unit 40, an original document including background image storage unit 42, an original document region detection unit 44 (one example of an original document region detection unit), and an original document image storage unit 46. The background image storage unit 40 stores a background image 50 (refer to FIG. 3 and FIG. 4) that is obtained by imaging the opening plate 20 as the background of the original document 24 using the camera 12 in a state where the original document 24 is not arranged. The original document including background image storage unit 42 stores an original document including background image 52 (refer to FIG. 5 and FIGS. 6A and 6B) that is obtained by imaging the same range as the background image using the camera 12 in a state where the original document 24 is arranged on the upper surface of the opening plate 20.

Figure 3:
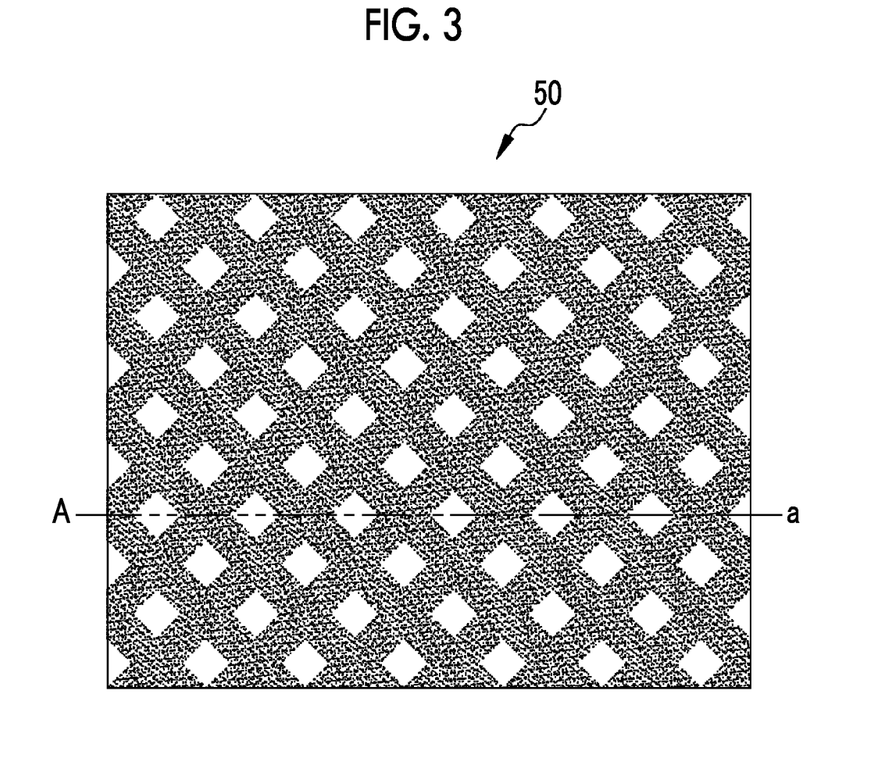
FIG. 3 is a descriptive diagram of a background image.
Figure 4:
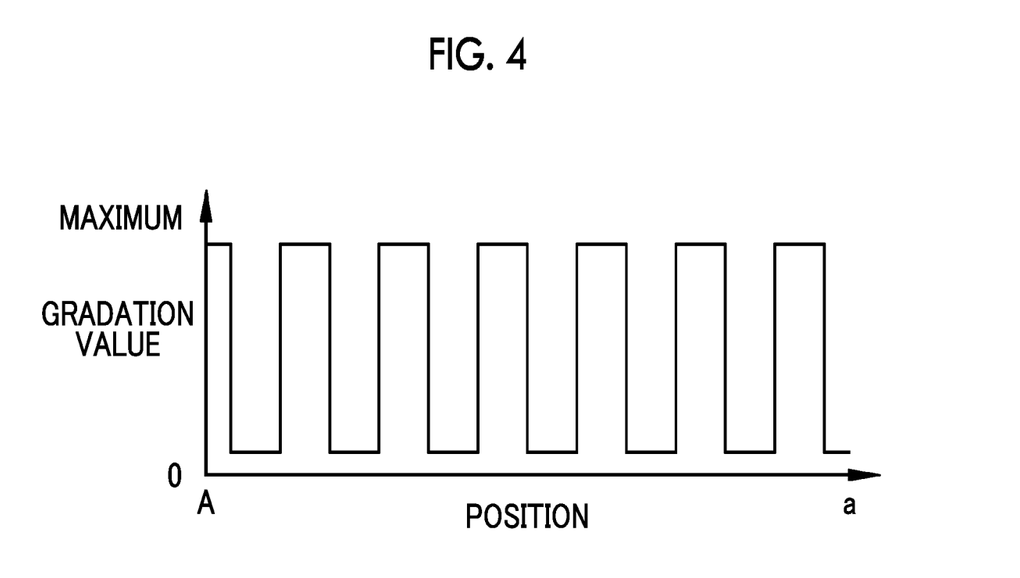
FIG. 4 is a descriptive diagram illustrating "position-gradation value" characteristics of the background image.

As illustrated in FIG. 3, the background image 50 is an image obtained by imaging the opening plate 20 in which the openings 28 are longitudinally and laterally arranged at the predetermined pitches, that is, an image of a predetermined pattern (pattern image). As illustrated in FIG. 4, the relationship between a position (pixel position) and a gradation value ("position-gradation value" characteristics) in the image of the background image 50 is such that the part of the main body 26 of the opening plate 20 is white, that is, the gradation value is high, and the part of the openings 28 of the opening plate 20 is black, that is, the gradation value is low. FIG. 4 illustrates the "position-gradation value" characteristics at a mark "A-a" in FIG. 3.

Figure 5:
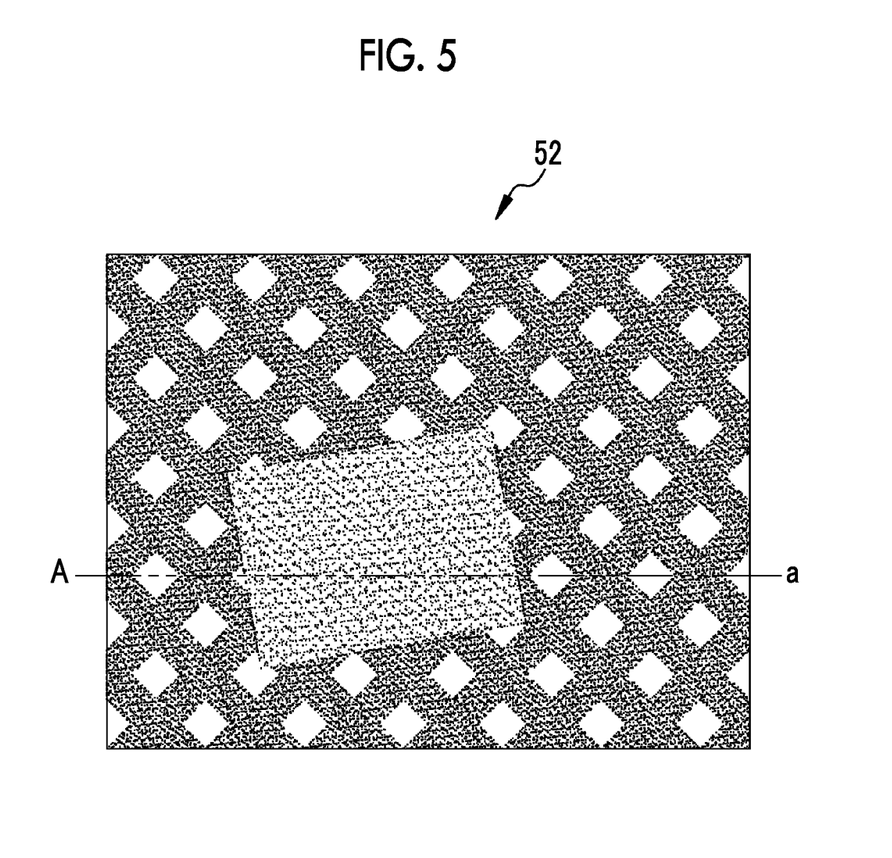
FIG. 5 is a descriptive diagram of an original document including background image.
Figure 6A:
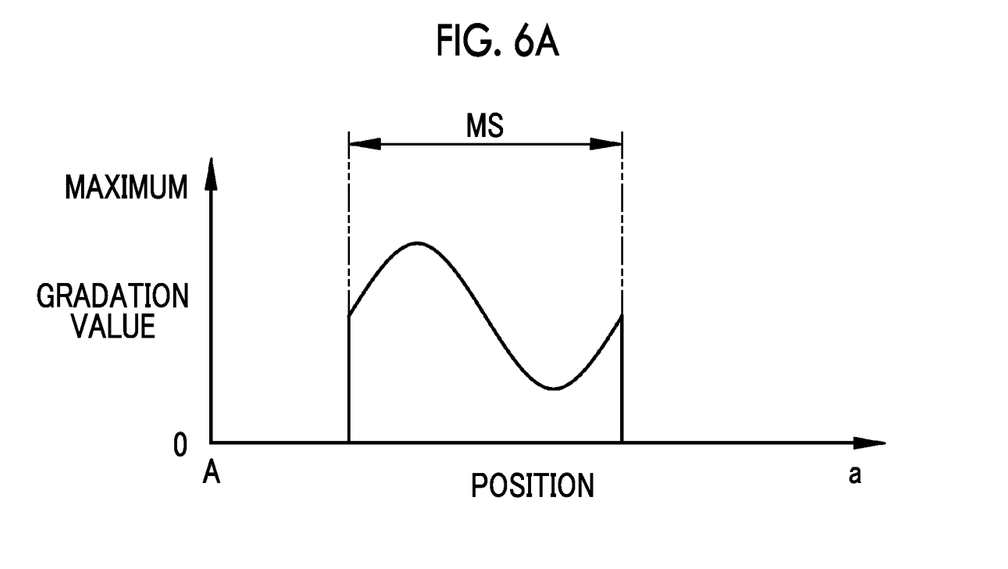
FIG. 6A is a descriptive diagram illustrating the "position-gradation value" characteristics of the original document including background image.
Figure 6B:
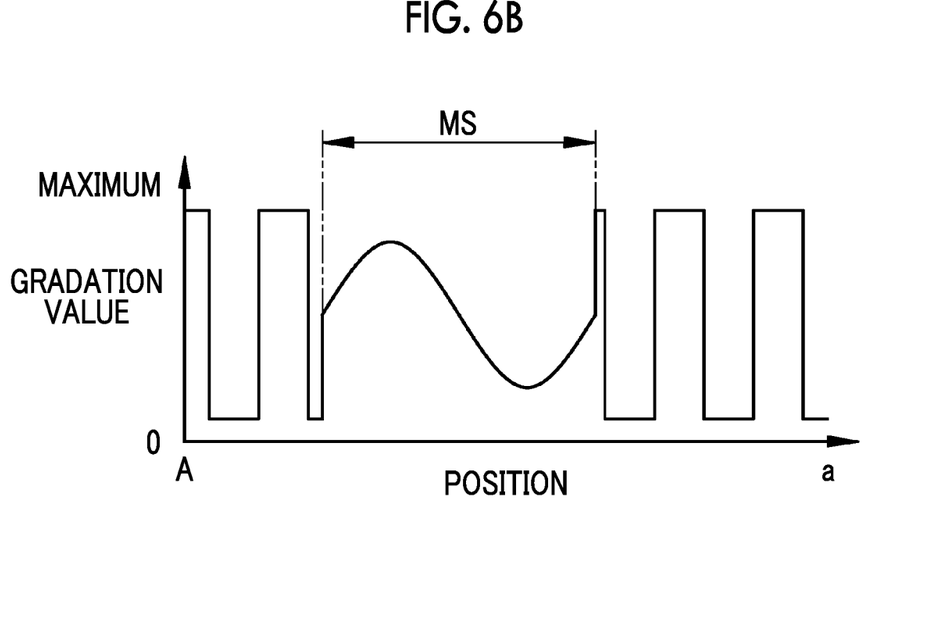
FIG. 6B is a descriptive diagram illustrating the "position-gradation value" characteristics of the original document including background image.

As illustrated in FIG. 5, the original document including background image 52 is obtained by arranging the original document 24 on the opening plate 20 and imaging the same range as the background image 50. In a case where the "position-gradation value" characteristics of the original document 24 have a wave form as illustrated in FIG. 6A, the "position-gradation value" characteristics of the original document including background image 52 obtained by imaging in a state where the original document 24 is arranged are the same "position-gradation value" characteristics as the original document 24 in a region MS of the original document 24, and are the same "position-gradation value" characteristics as the background image 50 in a region other than the region of the original document 24 as illustrated in FIG. 6B. FIGS. 6A and 6B illustrate the "position-gradation value" characteristics at the mark "A-a" in FIG. 5.

Returning to FIG. 2, the original document region detection unit 44 detects the region MS of the original document 24 of the original document including background image 52 based on the background image 50 stored in the background image storage unit 40 and the original document including background image 52 stored in the original document including background image storage unit 42. In a case where the region MS of the original document 24 is detected, the control unit 16 generates an original document image by cutting (extracting) the region MS of the original document 24 from the original document including background image 52, and stores the generated original document image in the original document image storage unit 46. By doing so, electronic data (image data) of the original document image can be obtained.

Hereinafter, the detection of the region MS of the original document 24 by the original document region detection unit 44 will be described in detail. As illustrated in FIG. 2, the original document region detection unit 44 comprises a difference image generation unit 60 (one example of a difference image generation unit), an inverse difference image generation unit 62 (one example of an inverse difference image generation unit), a sum image generation unit 64 (one example of a sum image generation unit), a binarization processing unit 66, and a rectangular region calculation unit 68. By these units, the original document region detection unit 44 detects the region MS of the original document 24.

The difference image generation unit 60 generates a difference image 70 (refer to FIG. 7 and FIGS. 8A and 8B) by subtracting the background image 50 (refer to FIG. 3 and FIG. 4) from the original document including background image 52 (refer to FIG. 5 and FIGS. 6A and 6B), specifically, by subtracting the gradation values of the corresponding pixels of the background image from the gradation values of the pixels of the original document including background image 52, respectively. The gradation value represents light and shade of an image (color) in the range of "0" to a "predetermined upper limit value (for example, 255)". Thus, in the calculation between images like the generation of the difference image 70 and generation of an inverse difference image 80 and generation of a sum image 90 described below, in a case where the gradation value is negative, the gradation value is regarded as "0". In a case where the gradation value exceeds the upper limit value, the gradation value is regarded as the "upper limit value".

Figure 7:
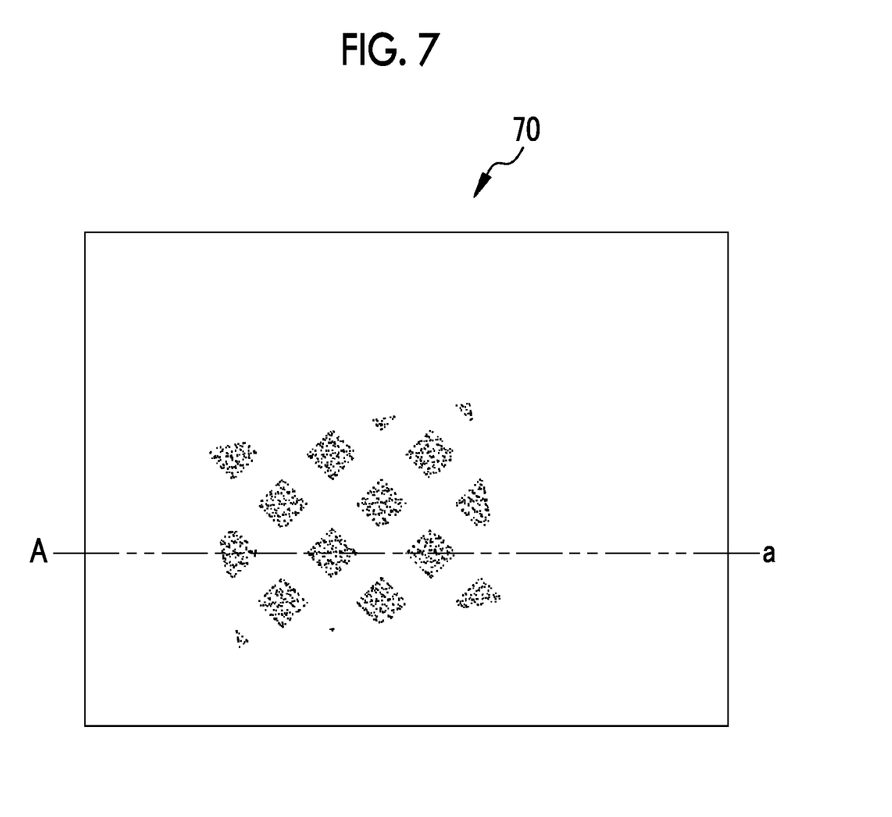
FIG. 7 is a descriptive diagram of a difference image.
Figure 8A:
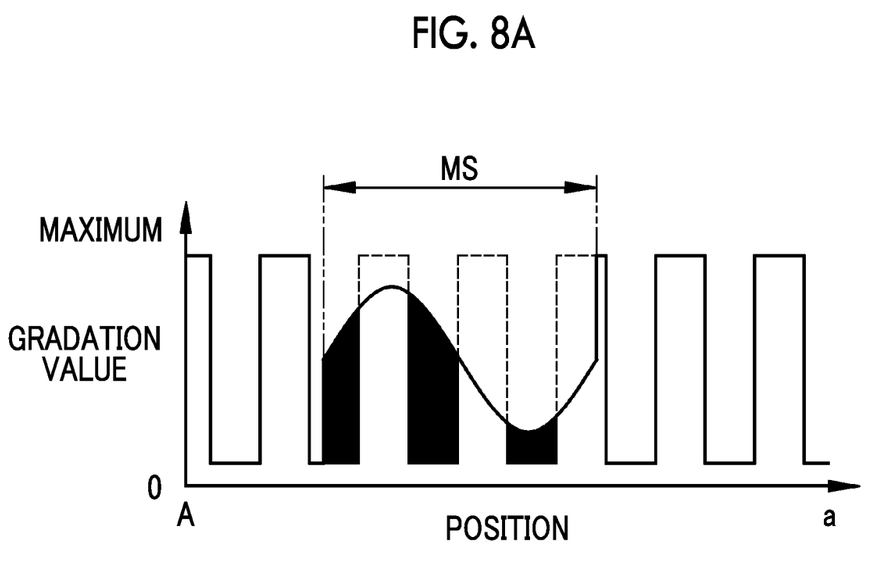
FIG. 8A is a descriptive diagram illustrating the "position-gradation value" characteristics of the difference image.
Figure 8B:
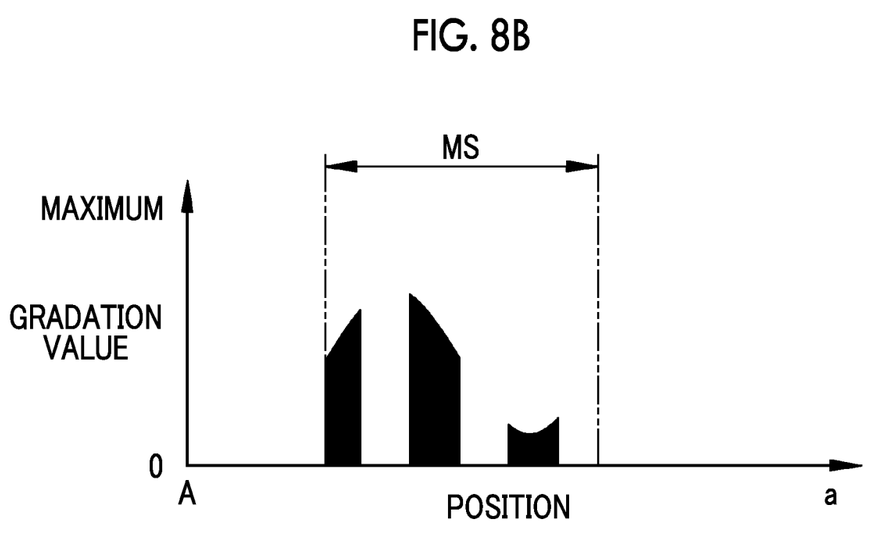
FIG. 8B is a descriptive diagram illustrating the "position-gradation value" characteristics of the difference image.

FIG. 7 illustrates the difference image 70 generated by the difference image generation unit 60. The difference image 70 is configured with the gradation values (gradation values corresponding to filled regions in FIG. 8A) that remain after the background image 50 illustrated by a broken line in FIG. 8A is subtracted from the original document including background image 52 illustrated by a solid line in FIG. 8A. Thus, the "position-gradation value" characteristics of the difference image 70 are obtained as illustrated in FIG. 8B.

More specifically, in the region other than the region MS of the original document 24 in the difference image 70, the background image 50 and the original document including background image 52 are the same images. Thus, the gradation value is set to "0". In the region MS of the original document 24 in the difference image 70, the image of the opening plate 20 is subtracted from the image of the original document 24. In the image of the opening plate 20, the gradation value of the part of the main body 26 is high, and the gradation value of the part of the openings 28 is low. Thus, in a case where the image of the opening plate 20 is subtracted from the image of the original document 24, the gradation values in the part of the main body 26 are set to "0", and the gradation values in the part of the openings 28 remain.

The inverse difference image generation unit 62 generates the inverse difference image 80 (refer to FIG. 9 and FIGS. 10A and 10B) in the opposite manner to the difference image generation unit 60 by subtracting the original document including background image 52 (refer to FIG. 5 and FIGS. 6A and 6B) from the background image 50 (refer to FIG. 3 and FIG. 4), specifically, by subtracting the gradation values of the corresponding pixels of the original document including background image 52 from the gradation values of the pixels of the background image 50, respectively.

Figure 9:
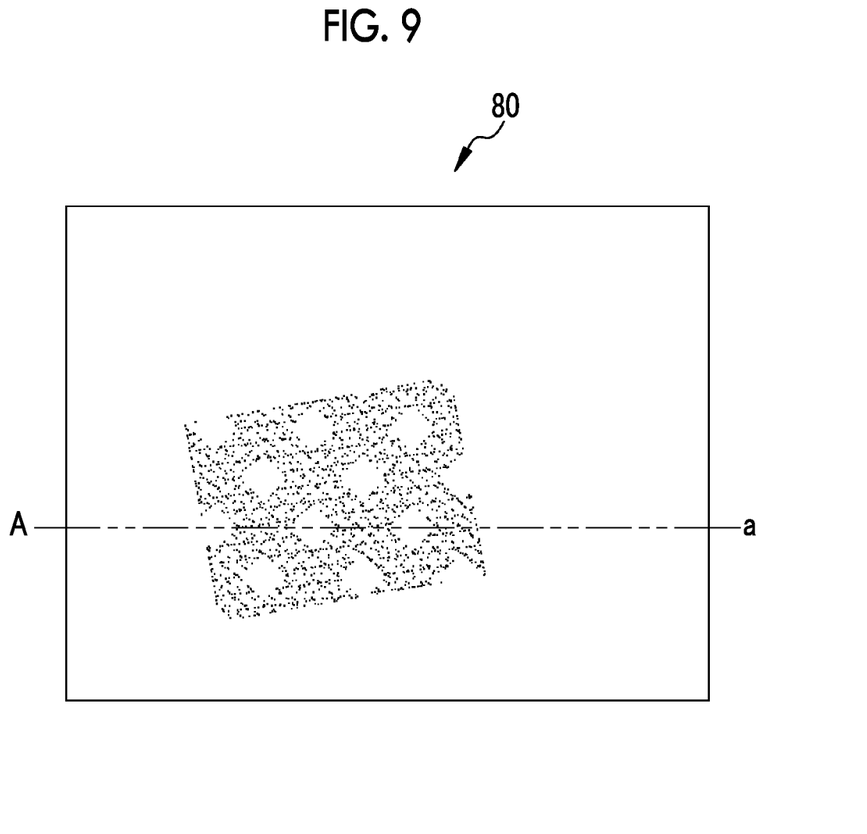
FIG. 9 is a descriptive diagram of an inverse difference image.
Figure 10A:
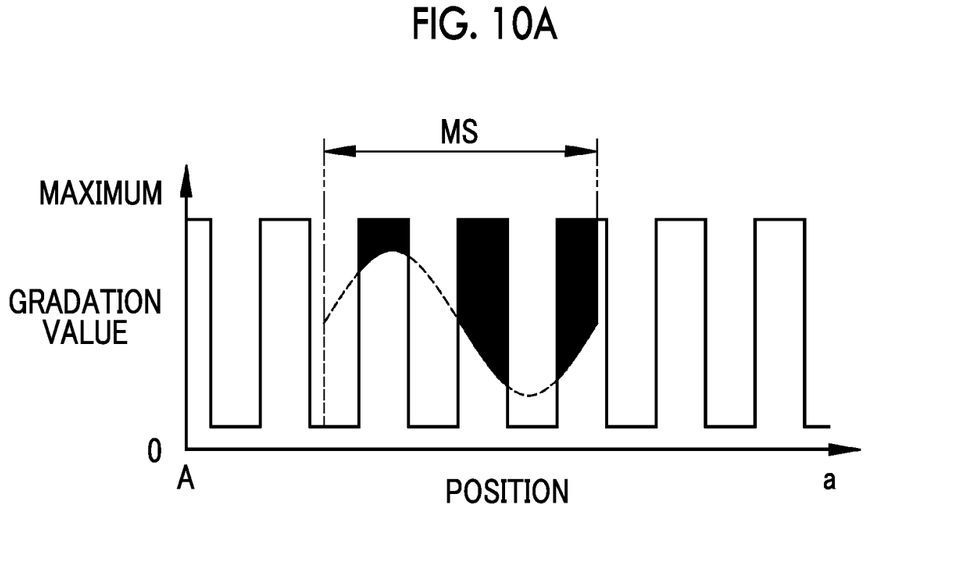
FIG. 10A is a descriptive diagram illustrating the "position-gradation value" characteristics of the inverse difference image.
Figure 10B:
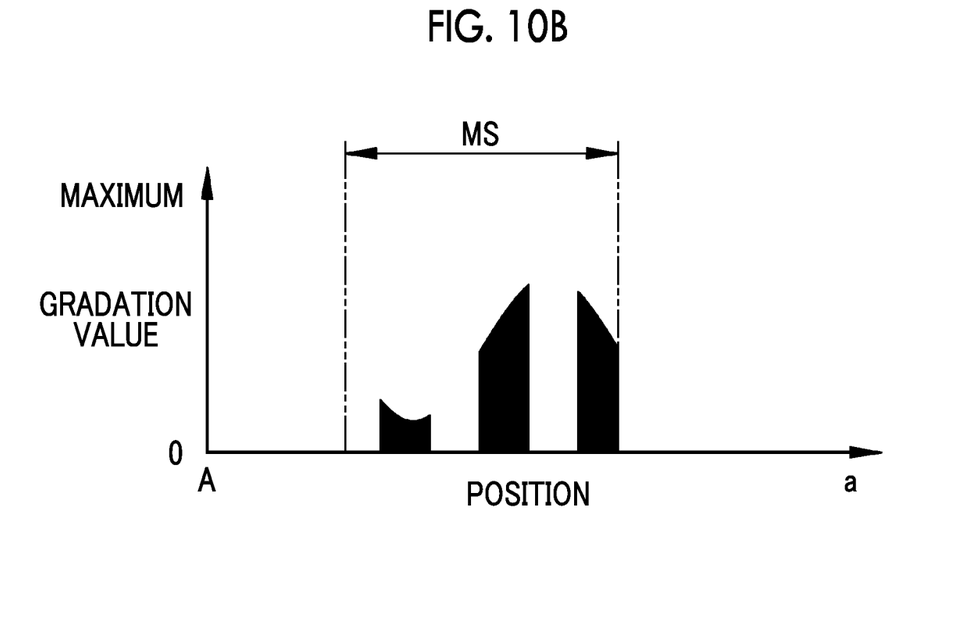
FIG. 10B is a descriptive diagram illustrating the "position-gradation value" characteristics of the inverse difference image.

FIG. 9 illustrates the inverse difference image 80 generated by the inverse difference image generation unit 62. The inverse difference image 80 is configured with the gradation values (gradation values corresponding to filled regions in FIG. 10A) that remain after the original document including background image 52 illustrated by a broken line in FIG. 10A is subtracted from the background image 50 illustrated by a solid line in FIG. 10A. Thus, the "position-gradation value" characteristics of the inverse difference image 80 are obtained as illustrated in FIG. 10B.

More specifically, in the region other than the region MS of the original document 24 in the inverse difference image 80, the background image 50 and the original document including background image 52 are the same images. Thus, the gradation value is set to "0". In the region MS of the original document 24 in the inverse difference image 80, the image of the original document 24 is subtracted from the image of the opening plate 20. In the image of the opening plate 20, the gradation value of the part of the main body 26 is high, and the gradation value of the part of the openings 28 is low. Thus, in a case where the image of the original document 24 is subtracted from the image of the opening plate 20, the gradation values in the part of the main body 26 remain, and the gradation values in the part of the openings 28 are set to "0" unlike the difference image 70.

The sum image generation unit 64 generates the sum image 90 (refer to FIG. 11 and FIG. 12) by combining the difference image 70 (refer to FIG. 7 and FIGS. 8A and 8B) generated by the difference image generation unit 60 with the inverse difference image 80 (refer to FIG. 9 and FIGS. 10A and 10B) generated by the inverse difference image generation unit 62, specifically, by summing the gradation values of the pixels of the difference image 70 and the gradation values of the corresponding pixels of the inverse difference image 80, respectively.

Figure 11:
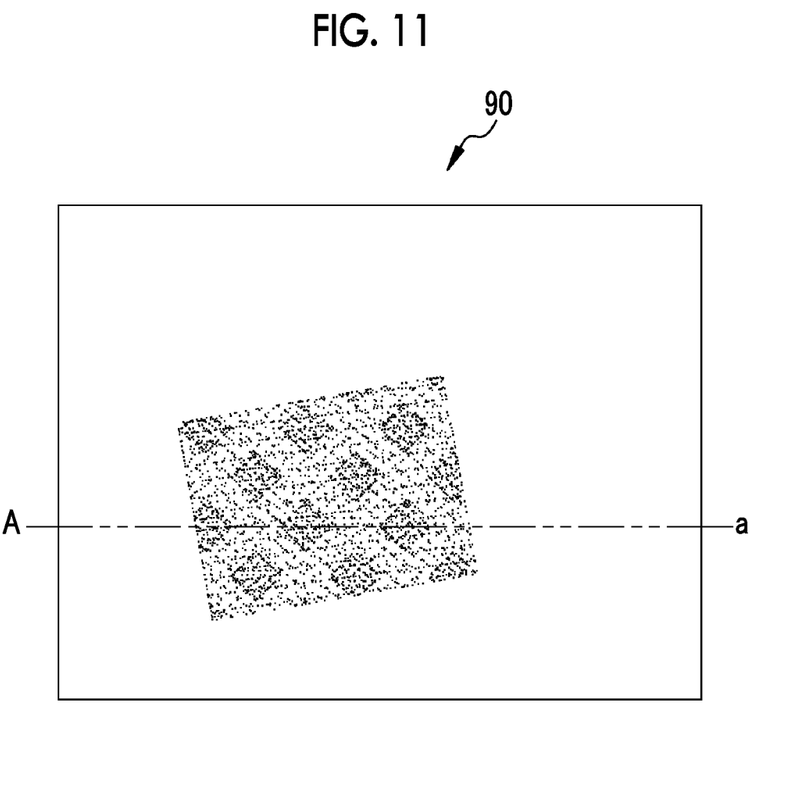
FIG. 11 is a descriptive diagram of a sum image.

FIG. 11 illustrates the sum image 90 generated by the sum image generation unit 64. The sum image 90 is obtained by combining the difference image 70 with the inverse difference image 80. Thus, as illustrated in FIG. 12, the "position-gradation value" characteristics of the difference image 70 are obtained by combining the filled parts in FIG. 8B with the filled parts in FIG. 10B.

More specifically, in the region other than the region MS of the original document 24 in the sum image 90, the gradation values of the difference image 70 and the inverse difference image 80 are "0". Thus, the gradation value remains at "0". In the region MS of the original document 24, the gradation values of the difference image 70 remain in the part of the openings 28 of the opening plate 20, and the gradation values of the inverse difference image 80 remain in the part of the main body 26 of the opening plate 20. That is, in the sum image 90, the gradation values in only the region MS of the original document 24 remain, and the gradation values in the region other than the region MS of the original document 24 are "0".

Figure 12:
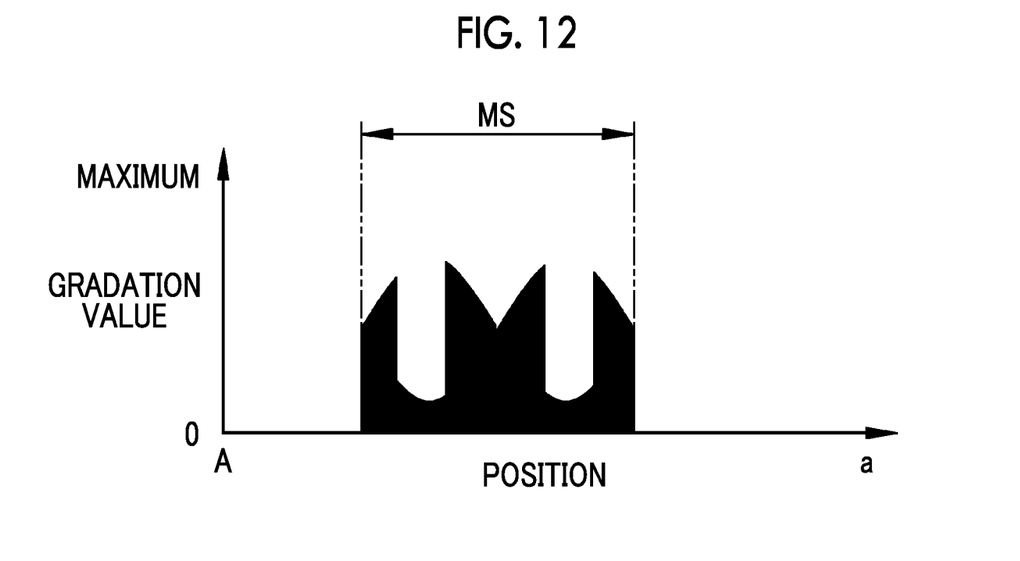
FIG. 12 is a descriptive diagram illustrating the "position-gradation value" characteristics of the sum image.
Figure 13:
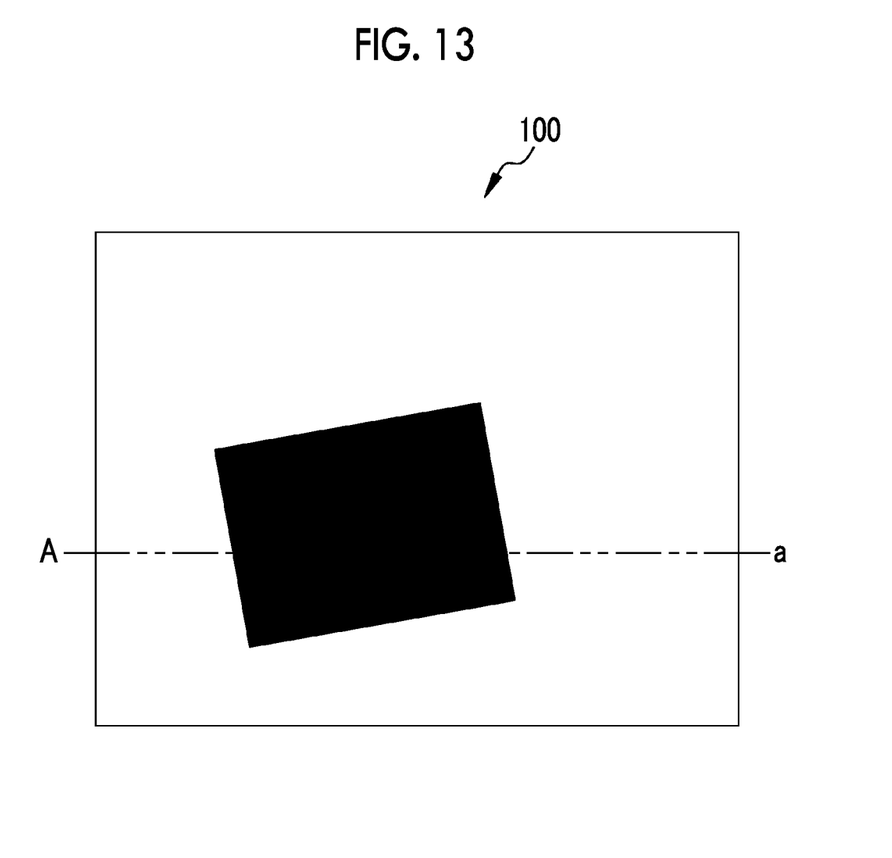
FIG. 13 is a descriptive diagram of a binarized image.
Figure 14:
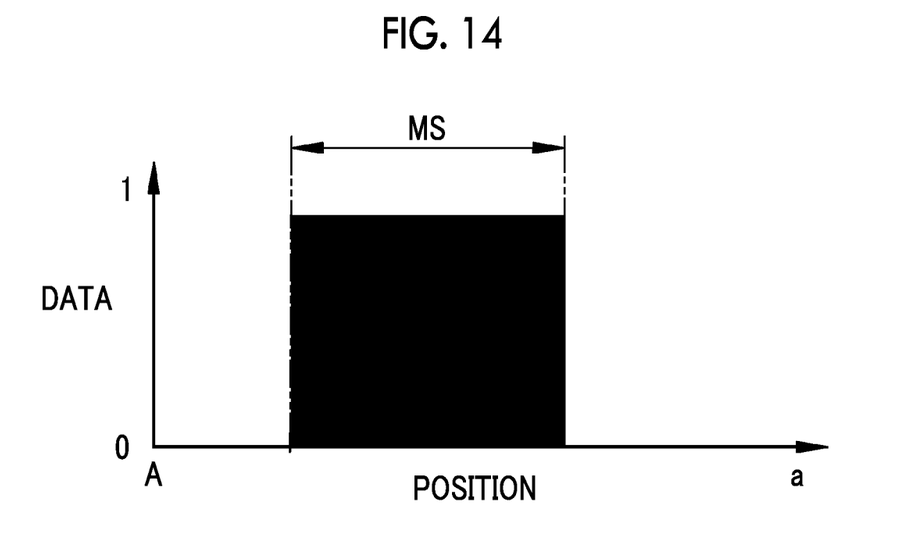
FIG. 14 is a descriptive diagram illustrating "position-data" characteristics of the binarized image.

The binarization processing unit 66 generates a binarized image 100 (refer to FIG. 13 and FIG. 14) by performing a binarization process on the sum image 90 (refer to FIG. 11 and FIG. 12). The binarization process is a process of assigning data of "0" or "1" to each pixel of the image. The binarization processing unit 66 determines whether or not the gradation value of each pixel of the sum image 90 is higher than a predetermined threshold value (for example, 50) by analyzing the sum image 90. The binarization processing unit 66 assigns "1" in a case where the gradation value is higher than the threshold value, and assigns "0" in a case where the gradation value is lower than or equal to the threshold value. The binarized image 100 is an image that is configured with the assigned data. In FIG. 13 and FIG. 14 described below, a region (pixels) having data "1", that is, a region having the gradation value higher than the threshold value, is illustrated by coloration.

FIG. 13 illustrates the binarized image 100 generated by the binarization processing unit 66. FIG. 14 illustrates "position-data" characteristics of the binarized image 100. In FIG. 13 and FIG. 14, in the binarized image 100, data in the region MS of the original document 24 is "1", and data in the region other than the region MS of the original document 24 is "0". Accordingly, a boundary between the region MS of the original document 24 and the region other than the region MS of the original document 24 is clarified.

As described above, the binarized image 100 is generated for clarifying the boundary of the region MS of the original document 24. Thus, in a case where a part having data "0" occurs in the region MS of the original document 24, the data of the region MS of the original document 24 may be set to "1" by setting a lower threshold value. Conversely, in a case where a part having data "1" occurs in the region other than the region MS of the original document 24, the data of the region other than the region MS of the original document 24 may be set to "0" by setting a higher threshold value.

Furthermore, a possibility of a state where a noise is mixed in the binarized image 100 and a small number (few number) of one of the region having data "1" and the region having data "0" are mixed in another is considered. Thus, a component of the other region that is mixed in one region may be removed by performing a noise removal process. That is, in a case where a small number of parts having data "0" are present in the region having data "1", the parts may be removed. In a case where a small number of parts having data "1" are present in the region having data "0", the parts may be removed. Preprocessing such as smoothing treatment or a median value process may also be performed on other images (the background image 50, the original document including background image 52, the difference image 70, the inverse difference image 80, the sum image 90, and the like) as a process of reducing the noise.

Figure 15:
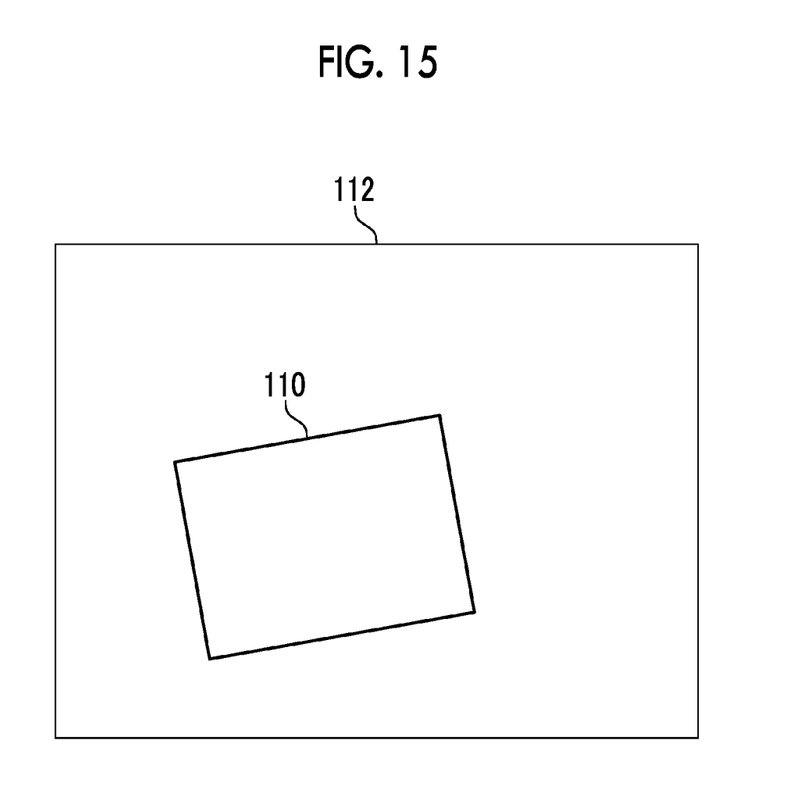
FIG. 15 is a descriptive diagram illustrating a region detected as a region of an original document.

The rectangular region calculation unit 68 extracts a boundary between a region having the gradation value equal to the "maximum value" and a region having the gradation value "0" in the binarized image 100, and calculates line segments of a rectangle that is most similar to the shape of the boundary. The original document region detection unit 44 detects a region surrounded by the calculated line segments of the rectangle as the region MS of the original document 24. In the present embodiment, a region designated by reference sign 110 in FIG. 15 (region surrounded by a thick line) is detected as the region MS of the original document 24. A thin line designated by reference sign 112 in FIG. 15 illustrates the periphery of the image (the background image 50, the original document including background image 52, and the like) captured by the camera 12.

Figure 16:
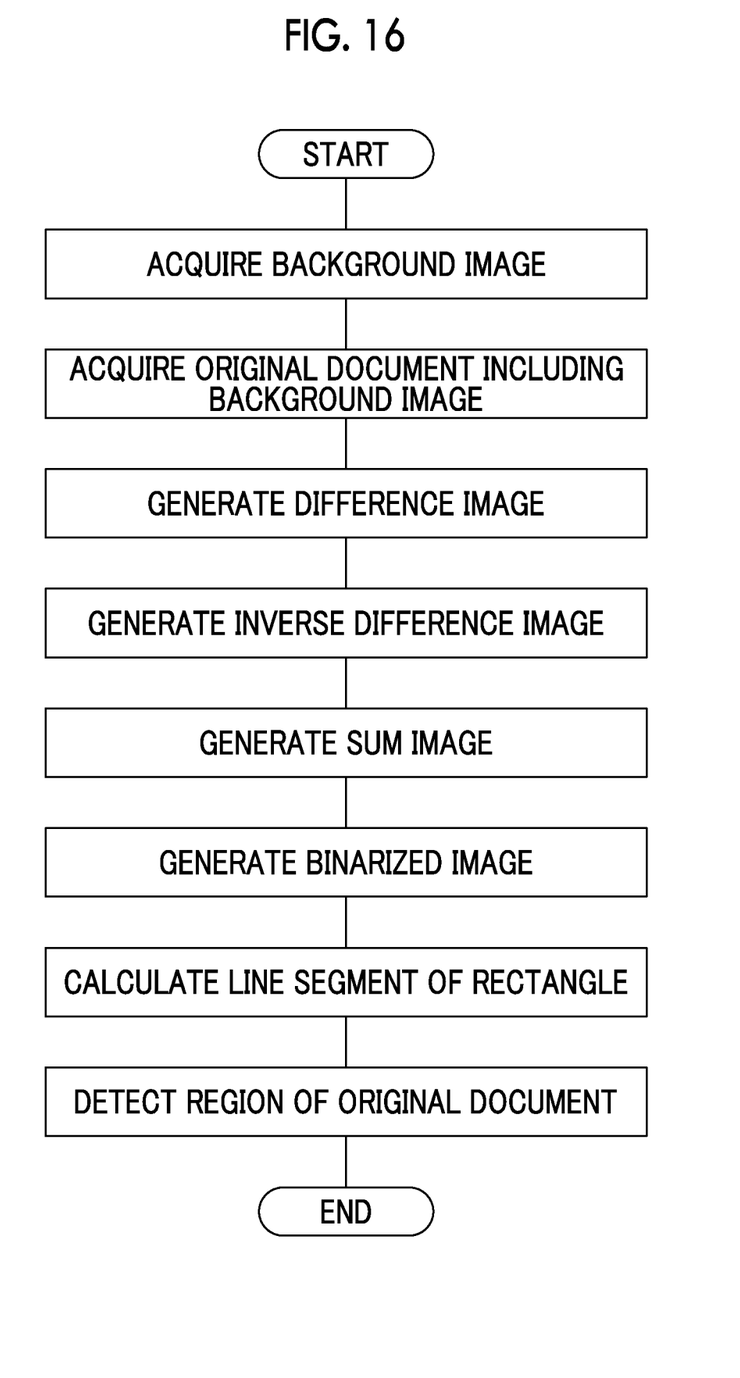
FIG. 16 is a flowchart illustrating a detection procedure of the region of the original document.

Hereinafter, an original document detection procedure using the original document detection apparatus 10 will be described based on FIG. 16. As illustrated in FIG. 16, in a case where the original document 24 is obtained as electronic data using the original document detection apparatus 10, the background image 50 (refer to FIG. 3 and FIG. 4) is acquired by imaging the opening plate 20 as the background of the original document 24 using the camera 12 in a state where the original document 24 is not arranged (imaging step). Next, the original document including background image 52 (refer to FIG. 5 and FIGS. 6A and 6B) is acquired by imaging the same range as the background image using the camera 12 in a state where the original document 24 is arranged on the upper surface of the opening plate 20 (imaging step).

Next, the difference image generation unit 60 generates the difference image 70 (refer to FIG. 7 and FIGS. 8A and 8B) by subtracting the background image 50 from the original document including background image 52 (difference image generation step). In addition, the inverse difference image generation unit 62 generates the inverse difference image 80 (refer to FIG. 9 and FIGS. 10A and 10B) by subtracting the original document including background image 52 from the background image 50 (inverse difference image generation step).

Then, the sum image generation unit 64 generates the sum image 90 (refer to FIG. 11 and FIG. 12) by combining the difference image 70 with the inverse difference image 80 (original document region detection step). Next, the binarization processing unit 66 generates the binarized image 100 (refer to FIG. 13 and FIG. 14) by performing the binarization process on the sum image 90 (original document region detection step). Furthermore, the rectangular region calculation unit 68 extracts the boundary between the region having data "1" and the region having data "0" in the binarized image 100, and calculates the line segments of the rectangle most similar to the shape of the boundary (original document region detection step). The original document region detection unit 44 detects the region surrounded by the calculated line segments of the rectangle as the region MS of the original document 24 (original document region detection step).

As described thus far, according to the original document detection apparatus 10, the region MS of the original document 24 is detected based on the difference image 70 and the inverse difference image 80. Thus, the region MS of the original document 24 can be more accurately detected than the region MS of the original document 24 that is detected based on only one of the difference image 70 and the inverse difference image 80.

In addition, in the original document detection apparatus 10, the openings 28 are formed at the predetermined pitches in the opening plate 20 on which the original document 24 is placed, such that the background image 50 is obtained as the pattern image. Thus, the region of the original document can be more accurately detected. That is, while it is more difficult to detect the region MS of the original document 24 as the degree of match (the magnitude of the gradation value or the ratio of matching "position-gradation value" characteristics) between the background image 50 and the original document 24 is increased, the original document 24 is generally an image of a scene, a person, a text string, or the like, and the degree of match between the original document 24 and the pattern image tends to be low. Thus, by setting the background image as the pattern image, the region MS of the original document 24 can be more accurately detected by decreasing the degree of match between the background image 50 and the original document 24.

Furthermore, in the original document detection apparatus 10, the main body 26 of the opening plate 20 is white, and the part of the openings 28 (the inner wall of the chamber 30 imaged through the openings 28) is black in order to increase the contrast of the background image 50. Accordingly, the degree of match between the background image 50 and the original document 24 can be further decreased, and the region MS of the original document 24 can be more accurately detected. That is, in a case where the edges of the original document 24 are white, it is difficult to determine a boundary between the main body 26 of the opening plate 20 and the edges of the original document 24. However, a boundary between the part of the openings 28 and the edges of the original document 24 is more clarified, and the region MS of the original document 24 can be more accurately detected than the region MS of the original document 24 in a case where the background image is not the pattern image or in a case where the background image is a low contrast image. In a case where the original document 24 is obtained by imaging a night scene and does not have edges (that is, in a case where the edges of the original document 24 have a color similar to black), it is difficult to determine the boundary between the part of the openings 28 of the opening plate 20 and the original document 24. However, the boundary between the part of the main body 26 and the original document 24 is more clarified, and the region MS of the original document 24 can be more accurately detected than the region MS of the original document 24 in a case where the background image is not the pattern image or in a case where the background image is a low contrast image.

In the present invention, the region of the original document may be detected based on the difference image and the inverse difference image. Thus, detailed configurations are not limited to the embodiment and can be appropriately changed. For example, in the embodiment, the main body of the opening plate is white, and the openings (the inner wall of the chamber imaged through the openings) are black in order to increase the contrast of the background image. Alternatively, the main body of the opening plate may be black, and the openings (the inner wall of the chamber) may be white. Furthermore, the inner wall of the chamber may be illuminated by arranging a white light source inside the chamber. The color combination of the main body and the openings of the opening plate may be other than white and black. Thus, for example, the main body may be red, and the openings may be blue.

In the embodiment, an example of arranging the original document on the opening plate in which the openings are formed is described. Alternatively, the original document may be arranged on a flat plate not having the openings. In this case, the original document cannot adhere by drawing air from the openings. However, an effect of improving the detection accuracy of the region of the original document using the difference image and the inverse difference image is obtained. In this case, in order to set the background image as the pattern image, the predetermined pattern may be printed on the flat plate. In addition, in this case, (in the case of arranging the original document on the flat plate), distortion, curling, positional deviation, and the like of the original document 24 may be prevented by causing the original document to stick to the flat plate using a material having stickiness or causing the original document to adhere to the flat plate using electrostatic force instead of causing the original document to adhere by drawing air.

In the embodiment, an example in which the background image is the pattern image in which squares are arranged at the predetermined pitches is described. However, the pattern of the background image is not for limitation purposes. For example, an image in which circles or stars are arranged at the predetermined pitches, or an image having a pattern of stripes, gradation, a checkerboard, or the like may be set as the background image. Furthermore, the background image does not need to be the pattern image. Thus, a solid image of a single color may be set as the background image. In this case, an effect of improving the detection accuracy of the region of the original document by decreasing the degree of match between the background image and the original document is reduced. However, the effect of improving the detection accuracy of the region of the original document using the difference image and the inverse difference image is the same as the embodiment.

In the embodiment, an example of disposing the binarization processing unit and the rectangular region calculation unit is described. Alternatively, at least one of the binarization processing unit or the rectangular region calculation unit may be removed. In the case of removing the binarization processing unit, the rectangular region calculation unit may calculate line segments forming a region of a rectangle most similar to the region having the gradation value higher than "0" (or the predetermined threshold value) in the sum image, and detect the region surrounded by the line segments as the region of the original document. In the case of removing the rectangular region calculation unit, the region having the gradation value higher than "0" (or the predetermined threshold value) in the binarized image generated by the binarization processing unit may be detected as the region of the original document. Furthermore, in the case of removing both of the binarization processing unit and the rectangular region calculation unit, the region having the gradation value higher than "0" (or the predetermined threshold value) in the sum image may be detected as the region of the original document.

In the embodiment, an example of disposing the sum image generation unit is described. Alternatively, the sum image generation unit may be removed. In this case, line segments of a rectangle that surrounds a range having the gradation value higher than "0" in the difference image or an image obtained by performing the binarization image on the difference image are calculated. In addition, line segments of a rectangle that surrounds a range having the gradation value higher than "0" in the inverse difference image or an image obtained by performing the binarization image on the inverse difference image are calculated. The region of the original document may be detected based on the calculated two types of line segments. As a specific method of detecting the region of the original document based on the two types of line segments, for example, it is considered that a range surrounded by line segments obtained by averaging the two types of line segments is detected as the region of the original document, or a region of a rectangle most similar to the range surrounded by the line segments obtained by averaging the two types of line segments is detected as the region of the original document.

EXPLANATION OF REFERENCES

- 10: original document detection apparatus
- 12: camera (imaging unit)
- 14: stage
- 16: control unit
- 20: opening plate
- 22: air drawing apparatus
- 24: original document
- 26: main body
- 28: opening
- 30: chamber
- 32: fan
- 40: background image storage unit
- 42: original document including background image storage unit
- 44: original document region detection unit
- 46: original document image storage unit
- 50: background image
- 52: original document including background image
- 60: difference image generation unit
- 62: inverse difference image generation unit
- 64: sum image generation unit
- 66: binarization processing unit
- 68: rectangular region calculation unit
- 70: difference image
- 80: inverse difference image
- 90: sum image
- 100: binarized image
- 110: region detected as region of original document
- 112: periphery of image captured by camera
- MS: region of original document

What is claimed is:

1. An original document detection apparatus comprising:
a camera that acquires a background image by imaging a background of an original document in a state where the original document is not arranged, and acquires an original document including background image by imaging the same range as the background image in a state where the original document is arranged on the background;
a processor configured to:
generate a difference image obtained by subtracting gradation values of corresponding pixels of the background image from gradation values of pixels of the original document including background image, respectively;
generate an inverse difference image obtained by subtracting the gradation values of the corresponding pixels of the original document including background image from the gradation values of the pixels of the background image, respectively;
generate a sum image obtained by summing gradation values of pixels of the difference image and gradation values of corresponding pixels of the inverse difference image; and
detect a region of the original document based on the sum image.

2. The original document detection apparatus according to claim 1,
wherein the processor detects a region having the gradation value of the pixel higher than a preset threshold value in the sum image as the region of the original document.

3. The original document detection apparatus according to claim 1,
wherein the processor calculates line segments of a rectangle that forms a boundary of a region having the gradation value higher than a preset threshold value in the sum image, and detects a region surrounded by the calculated line segments as the region of the original document.

4. The original document detection apparatus according to claim 1,
wherein the background image is an image having a predetermined pattern.

5. The original document detection apparatus according to claim 2,
wherein the background image is an image having a predetermined pattern.

6. The original document detection apparatus according to claim 3,
wherein the background image is an image having a predetermined pattern.

7. The original document detection apparatus according to claim 4,
wherein an opening plate in which a plurality of openings are arranged is the background.

8. The original document detection apparatus according to claim 5,
wherein an opening plate in which a plurality of openings are arranged is the background.

9. The original document detection apparatus according to claim 6,
wherein an opening plate in which a plurality of openings are arranged is the background.

10. The original document detection apparatus according to claim 7,
wherein an air drawing apparatus that draws air from the openings to a rear surface side of the opening plate is disposed.

11. The original document detection apparatus according to claim 8,
wherein an air drawing apparatus that draws air from the openings to a rear surface side of the opening plate is disposed.

12. The original document detection apparatus according to claim 9,
wherein an air drawing apparatus that draws air from the openings to a rear surface side of the opening plate is disposed.

13. The original document detection apparatus according to claim 10,
wherein the opening plate is white, and a black member is arranged behind the opening plate.

14. The original document detection apparatus according to claim 11, wherein the opening plate is white, and a black member is arranged behind the opening plate.

15. The original document detection apparatus according to claim 12, wherein the opening plate is white, and a black member is arranged behind the opening plate.

16. An original document detection method comprising:
an imaging step of acquiring a background image by imaging a background of an original document in a state where the original document is not arranged, and acquiring an original document including background image by imaging the same range as the background image in a state where the original document is arranged on the background;
a difference image generation step of generating a difference image obtained by subtracting gradation values of corresponding pixels of the background image from gradation values of pixels of the original document including background image, respectively;
an inverse difference image generation step of generating an inverse difference image obtained by subtracting the gradation values of the corresponding pixels of the original document including background image from the gradation values of the pixels of the background image, respectively;
a sum image generation step of generating a sum image obtained by summing gradation values of pixels of the difference image and gradation values of corresponding pixels of the inverse difference image; and
an original document region detection step of detecting a region of the original document based on the sum image.

* * * * *